(12) United States Patent  (10) Patent No.: US 6,639,996 B2
Suda  (45) Date of Patent: *Oct. 28, 2003

(54) IMAGE PROCESSING APPARATUS, IMAGE PROCESSING METHOD AND COMPUTER READABLE MEMORY MEDIUM

(75) Inventor: Hirofumi Suda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,219

(22) Filed: Apr. 8, 1999

(65) Prior Publication Data

US 2002/0114488 A1 Aug. 22, 2002

(30) Foreign Application Priority Data

Apr. 10, 1998 (JP) .............................. 10-098949
Apr. 5, 1999 (JP) .............................. 11-097590

(51) Int. Cl.[7] .................................. G06K 9/00
(52) U.S. Cl. ........................................ 382/100
(58) Field of Search ................ 382/100, 232, 382/248, 250, 251; 380/200, 201, 202, 203, 277; 705/64, 67; 348/161; 713/161, 168, 170, 176, 179, 180, 181

(56) References Cited

U.S. PATENT DOCUMENTS

| | | | | | |
|---|---|---|---|---|---|
| 5,809,139 | A | * | 9/1998 | Girod et al. | 380/202 |
| 5,960,081 | A | * | 9/1999 | Vynne et al. | 713/176 |
| 6,037,984 | A | * | 3/2000 | Isnardi et al. | 375/240.21 |
| 6,052,780 | A | * | 4/2000 | Glover | 713/193 |
| 6,101,602 | A | * | 8/2000 | Fridrich | 713/176 |
| 6,104,826 | A | * | 8/2000 | Nakagawa et al. | 382/100 |
| 6,115,818 | A | * | 9/2000 | Barton | 713/176 |
| 6,163,842 | A | * | 12/2000 | Barton | 713/176 |
| 6,188,728 | B1 | * | 2/2001 | Hurst | 375/240.16 |
| 6,208,735 | B1 | * | 3/2001 | Cox et al. | 380/54 |
| 6,208,745 | B1 | * | 3/2001 | Florencio et al. | 382/100 |
| 6,226,387 | B1 | * | 5/2001 | Tewfik et al. | 382/100 |
| 6,282,299 | B1 | * | 8/2001 | Tewfik et al. | 382/100 |

* cited by examiner

Primary Examiner—Andrew W. Johns
Assistant Examiner—Shervin Nakhjavan
(74) Attorney, Agent, or Firm—Fitzpatrick, Cella, Harper & Scinto

(57) ABSTRACT

There are provided an image processing apparatus, an image processing method, and a computer readable memory medium storing a program for such image processing method, which are featured by inputting image data, discriminating the motion of the image data, and superposing watermark information with the image data or the predetermined information data such as a motion vector employed in the encoding of the image data, according to the result of discrimination, thereby enabling concealing of the watermark information with the increased resistance against the attacking and with the reduced deterioration of the image.

22 Claims, 9 Drawing Sheets

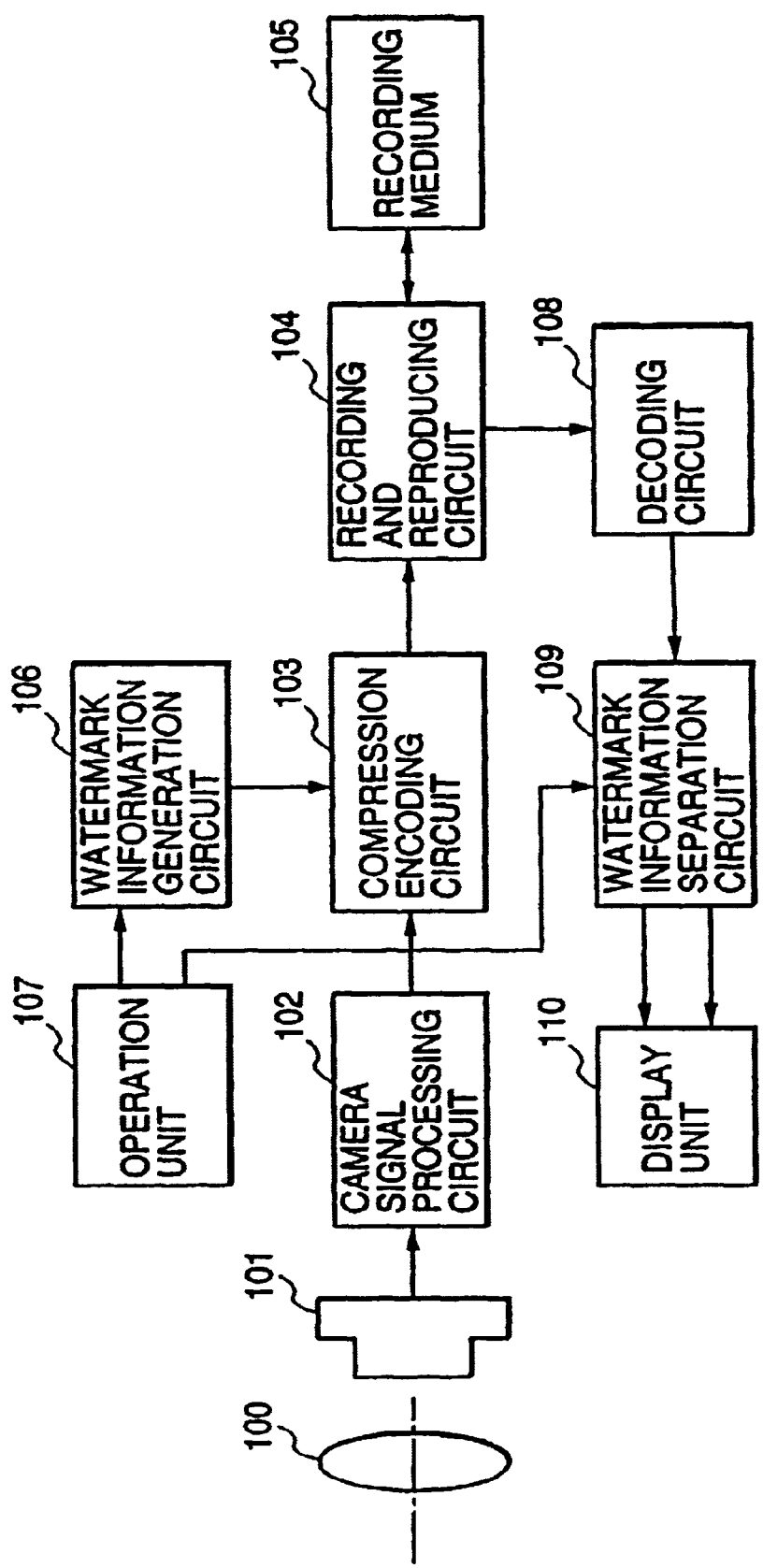

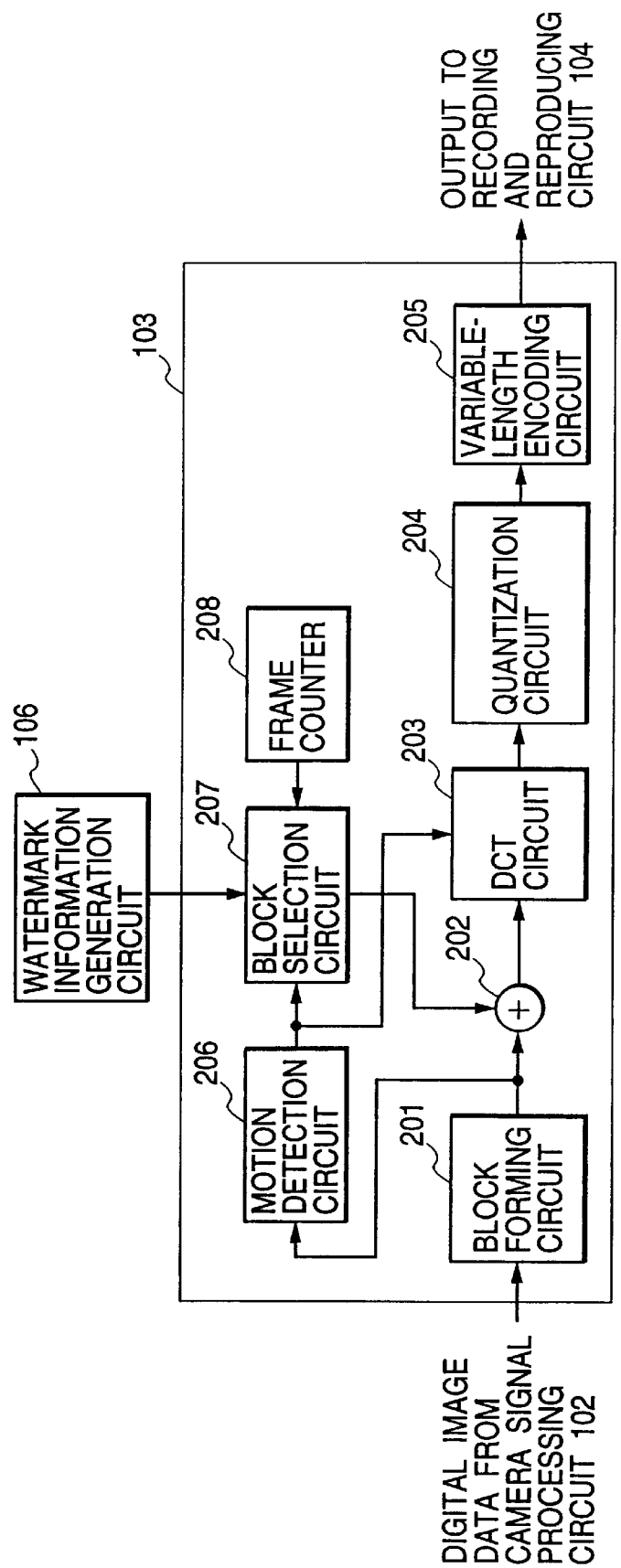

IMAGE PROCESSING APPARATUS, IMAGE PROCESSING METHOD AND COMPUTER READABLE MEMORY MEDIUM

BACKGROUND OF THE INVENTION

1. Field of the Invention

The present invention relates to an image processing apparatus, an image processing method and a computer readable memory medium storing an image processing program, for embedding watermark information in image data.

2. Related Background Art

For image recording/reproduction, there has conventionally been known the video cassette recorder which records an analog image signal on a magnetic tape, but copyright issues relating to illegal or improper use of image data has not been raised seriously with such apparatus because the image is deteriorated by repeated copying.

On the other hand, digital image data, formed by digitizing an image signal with eventual compression encoding, is easily handled and not only can be recorded on a magnetic tape in a digital VCR but also can be stored in a computer memory or transmitted through a communication channel. Illegal use is a serious concern for such digitized image data because such data is mostly free from image deterioration even after recording or transmission.

For avoiding such illegal use, it is already known to incorporate, in the image, a digital watermark constituting ID information data for the author, distribution source, management number, distribution channel etc. of the image data. The digital watermarking is to secretly conceal the watermark data into the image, undiscernibly to the user observing the image, in order to later confirm the source or channel of distribution of the illegally used image. In such watermarking, it is important to minimize the image deterioration resulting from the concealing of the watermark data, to conceal the watermark data in such a manner that such watermark alone cannot be extracted from the image, and to avoid a significant increase in the amount of information by the concealing of the watermark data.

In digital watermarking for a moving image, it is proposed to conceal the watermark data only in a part of the frames, since the amount of the watermark data becomes very large if such data is concealed in every frame. However, if the interval of the watermarked frames is made excessively large, the effectiveness of prevention from illegal use becomes lower in the case where only part of the moving image is used.

In the above-mentioned method of concealing the digital watermark in a part of the frames of the moving image, if the digital watermark is concealed over several frames in an area that does not deteriorate the image, there will result a drawback that not only the concealing of such digital watermark but also the position thereof become obvious through comparison of the image data of those frames with image data of the preceding or succeeding frames, because the change in the image data though the image itself is not deteriorated. Consequently it also becomes easy to extract only the watermark, for example by eliminating the watermarked frame.

SUMMARY OF THE INVENTION

In consideration of the foregoing, an object of the present invention is to provide an image processing apparatus, an image processing method and a computer readable memory medium storing a program for such image processing, capable of concealing watermark information in image data with an increased resistance to attack while suppressing image deterioration and increase in the data amount.

To attain the above-mentioned object according to one aspect of the present invention, there is provided an image processing apparatus/method in which image data is input, the motion of such image data is discriminated and watermark information is superposed with predetermined information data according to the result of the discrimination.

According to an another aspect of the present invention, there is provided a computer readable memory medium storing a program for executing an input step of entering image data, a discrimination step of discriminating motion of the image data, and a superposing step of superposing watermark information with predetermined information data according to the result of the discrimination.

Other objects of the invention, and features and advantages thereof, will become fully apparent from the following detailed description to be taken in conjunction with the accompanying drawings.

BRIEF DESCRIPTION OF THE DRAWINGS

FIG. 1 is a block diagram showing the configuration of a first embodiment in which the present invention is applied to a video camera;

FIG. 3 is a detailed block diagram showing a compression encoding circuit 103 in the first embodiment;

DETAILED DESCRIPTION OF THE PREFERRED EMBODIMENTS

Figure 2A:
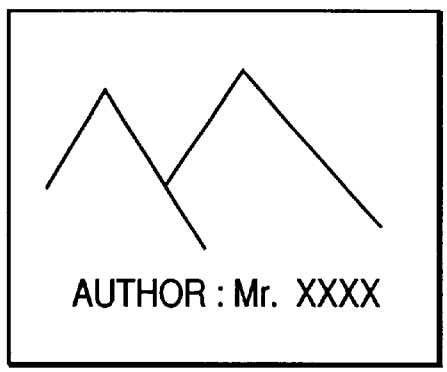
FIGS. 2A, 2B, 2C and 2D are views showing examples of image display in the present invention.

In the following there will be explained a first embodiment of the present invention, with reference to the accompanying drawings.

FIG. 1 is a block diagram showing the configuration of the first embodiment in which the present invention is applied to a video camera capable of recording and reproducing a moving image.

Referring to FIG. 1, an object image focused in an image pickup device 101 such as a CCD (charge coupled device) through an image taking lens 100 is converted into an electrical signal, which is converted by predetermined signal processing in a camera signal processing circuit 102 into digital image data. The digital image data are subjected, in a compression encoding circuit 103, to compression encoding to be explained later, and recorded by a recording/reproducing circuit 104 on a recording medium 105. The recording medium 105 can be composed, for example, of a hard disk, a memory card or a video tape.

A watermark information generation circuit 106 generates watermark information such as copyright information on the author, editor, copyright owner or user or information for clarifying the distribution channel, and such watermark information can be prepared by the manipulation of an operation unit 107.

The watermark information generated by the watermark information generation circuit 106 is concealed into the image data by the compression encoding circuit 103 in the course of encoding process, as will be explained later in more details.

The encoded image data, recorded on the recording medium 105, are reproduced by the recording/reproducing circuit 104, and decoded by a decoding circuit 108. The decoded image data are supplied to a watermark information separation circuit 109.

The watermark information separation circuit 109 separates the watermark information from the image data output from the decoding circuit 108. The image data processed in the watermark information separation circuit 109 is supplied to a display unit 110 and displayed thereon. The watermark information separation circuit 109 sends the separated watermark information to the display unit 110, according to an instruction from the operation unit 107.

More specifically, the watermark information separation circuit 109 can send either the entire watermark information or necessary information (for example, author information) from among all the watermark information, according to the instruction from the operation unit 107, to the display unit 110 for display thereon. It also is possible not to send any watermark information to the display unit 110, thereby not displaying the watermark information thereon.

If the watermark information is supplied from the watermark information separation circuit 109, the display unit 110 displays such watermark information together with the image data on a monitor.

FIGS. 2A to 2D show examples of the display on the display unit 110.

FIG. 2A shows an example of on-screen display of the author information, among the watermark information concealed as character information. In this example, since the watermark information is character information, the displayed characters are generated by a character generator in the display unit 110.

Figure 2B:
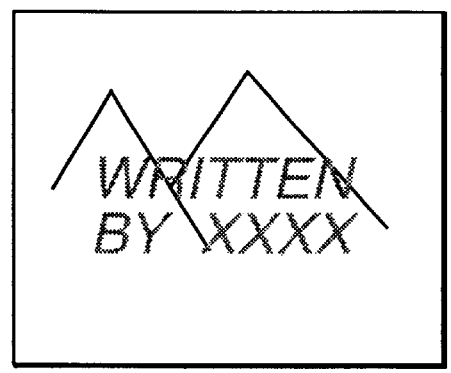

FIG. 2B shows an example in which the watermark information is concealed not as character information as in the case of FIG. 2A but as image information. In this example, the author information is displayed in superposition with the image.

Figure 2C:
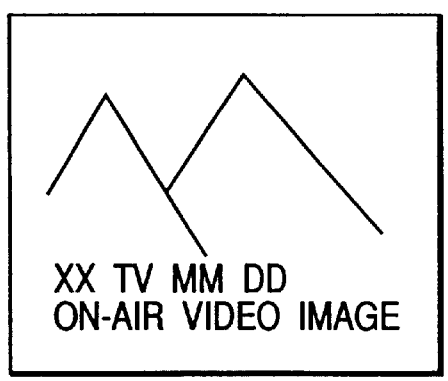

FIG. 2C shows an example of display of the distribution channel of the image. This example indicates that the image is distributed by television broadcasting.

Figure 2D:
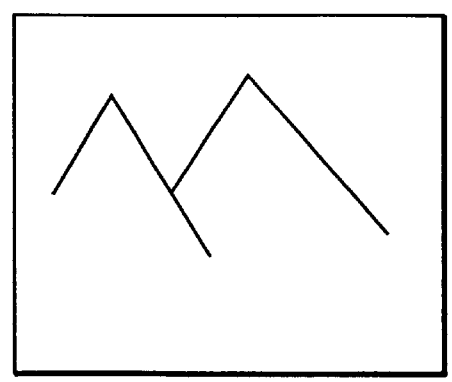

FIG. 2D shows an example of display in which the watermark information is turned off.

In the following there will be explained in detail the compression encoding circuit 103 with reference to FIG. 3, which is a detailed block diagram thereof in the first embodiment.

Referring to FIG. 3, the image data entered into the compression encoding circuit 103 are divided by a block forming circuit 201 into blocks of a size of 8×8 pixels in the horizontal and vertical directions, and the image data divided into such block are supplied to a motion detection circuit 206 and an adder 202.

Figure 4:
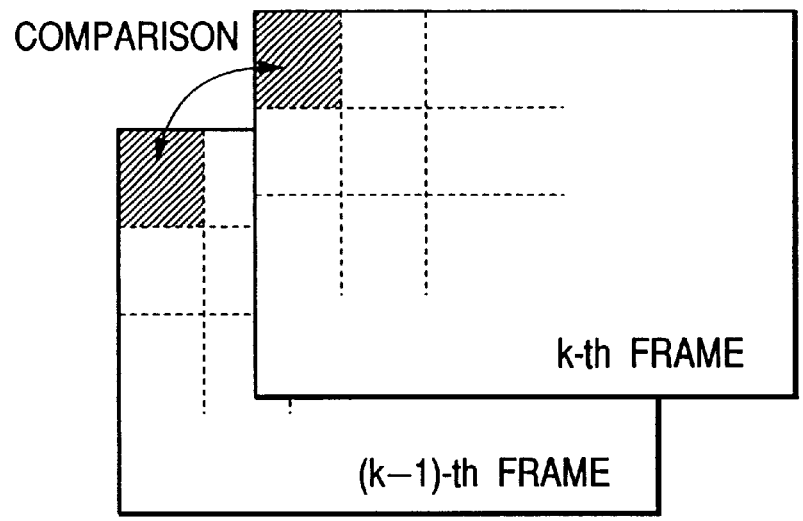
FIG. 4 is a view showing a discrimination process for a motion in block.

The motion detection circuit 206 discriminates the motion of the image data in each unit (block). As shown in FIG. 4, the motion of image data of each block is discriminated by comparing the block data between the current frame (k-th frame) and the immediately preceding frame ((k−1)th frame). In this embodiment, the difference between the current frame and the preceding frame is calculated in the block unit basis and the motion of the current block is discriminated from such difference. More specifically, the motion is discriminated as "present" or "absent", respectively, if the difference is large or small.

Figure 5:
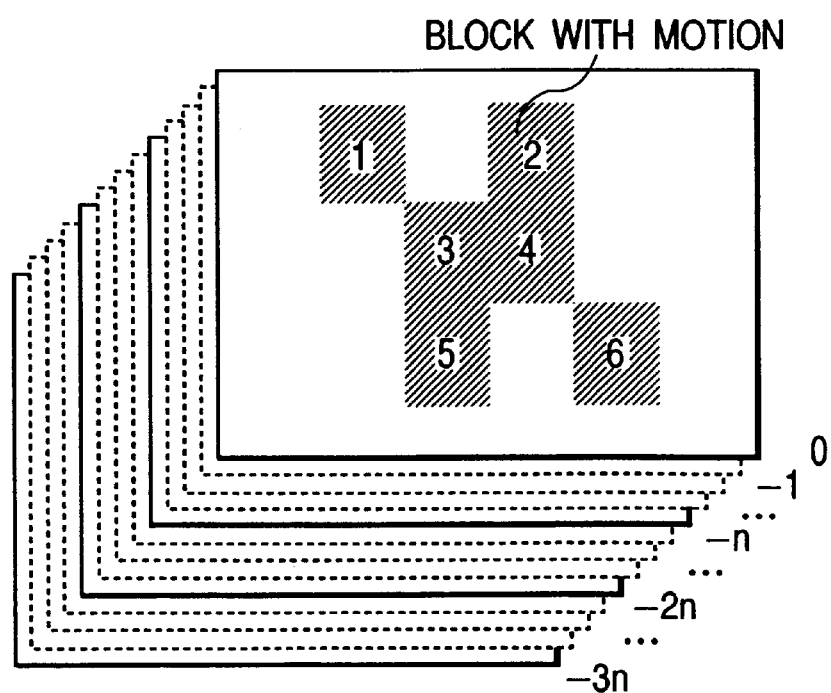
FIG. 5 is a view showing a block with motion within a frame.

A block identified by the motion detection circuit 206 as showing motion, as shown in FIG. 5, is selected by a block selection circuit 207, and the watermark information generated by the watermark information generation circuit 106 is superposed, in the adder 202, to the image data of such block showing motion. However, the block selection circuit 207 conceals the watermark information only in a frame in which motion is detected in a predetermined number of blocks, based on a predetermined frame interval obtained by a frame counter 208. Thus, the watermark information is not concealed in the image data of all frames, but is superposed with the image data of the blocks with motion with a fixed frame interval or with a random frame interval.

In the following there will be explained the method of superposing the watermark information with the image data in the first embodiment.

The concealing of the watermark information in the image data is achieved by the concealing of encoded watermark information, in consideration of the redundancy (noise margin) of the image.

In the present embodiment, one bit of the watermark information is concealed in each block showing motion. Watermark information of plural bits in total is concealed by concealmeant in plural blocks. Also, the order of concealing of the watermark information has to be determined in advance in order to enable decoding of the watermark information. In the present embodiment, the watermark information is concealed in succession into each block showing motion, starting from the block at the upper left corner of the image. FIG. 5 shows an example of the order of concealing of the watermark information, and the numbers in the blocks indicate the order of concealing of the watermark information.

Again referring to FIG. 3, a DCT circuit 203 executes DCT (discrete cosine transformation) on the image data output from the adder 202, in each unit (block). The DCT circuit 203 has a frame DCT mode (for effecting DCT in each block of 8×8 pixels) and a field DCT mode (dividing the block of 8×8 pixels into blocks of 4×8 pixels respectively in the first and second fields and effecting DCT in thus divided blocks), and switches these modes according to the result of motion detection by the motion detection circuit 206. More specifically, it selects the field mode in the case where motion is present, and the frame mode in the case where motion is absent.

The image data transformed by the DCT circuit 203 are quantized by a quantization circuit 204, and then subjected to data compression by variable-length encoding such as Huffman encoding in a variable length encoding circuit 205.

The watermark information can be code information obtained by encoding information, or an image signal represented for example by luminance or color information.

In the present embodiment, the watermark information is concealed in a part of the space of the image with motion, whereby the watermark information is scarcely detectable in the decoded image but the watermark information continues to remain in the encoded image.

Also, as the watermark information is concealed in the moving image only in a part thereof in which motion is detected, it is possible to prevent an increase in the data amount. Also, as the still image portion does not contain the watermark information, it is not possible to extract the watermark information through comparison of successive images, so that any third person is unable to find the presence of the watermark or the location thereof. Furthermore, as the watermark information cannot be extracted even after the moving image is cut out or modified, the advantages of preventing illegal use of the moving image and tracing such illegal use may be obtained.

Furthermore, the watermark information is concealed only in an image area showing motion, so that the image deterioration resulting from the concealing of the watermark information can be rendered inconspicuous visually.

In the following there will be explained a second embodiment with reference to the accompanying drawings.

The overall configuration of the second embodiment is similar to that of the first embodiment and is as already explained with reference to FIG. 1. However, the internal configuration of the compression encoding circuit 103 is different from that in the first embodiment. In the following there will be explained the configuration and the process of the compression encoding circuit 103.

Figure 6:
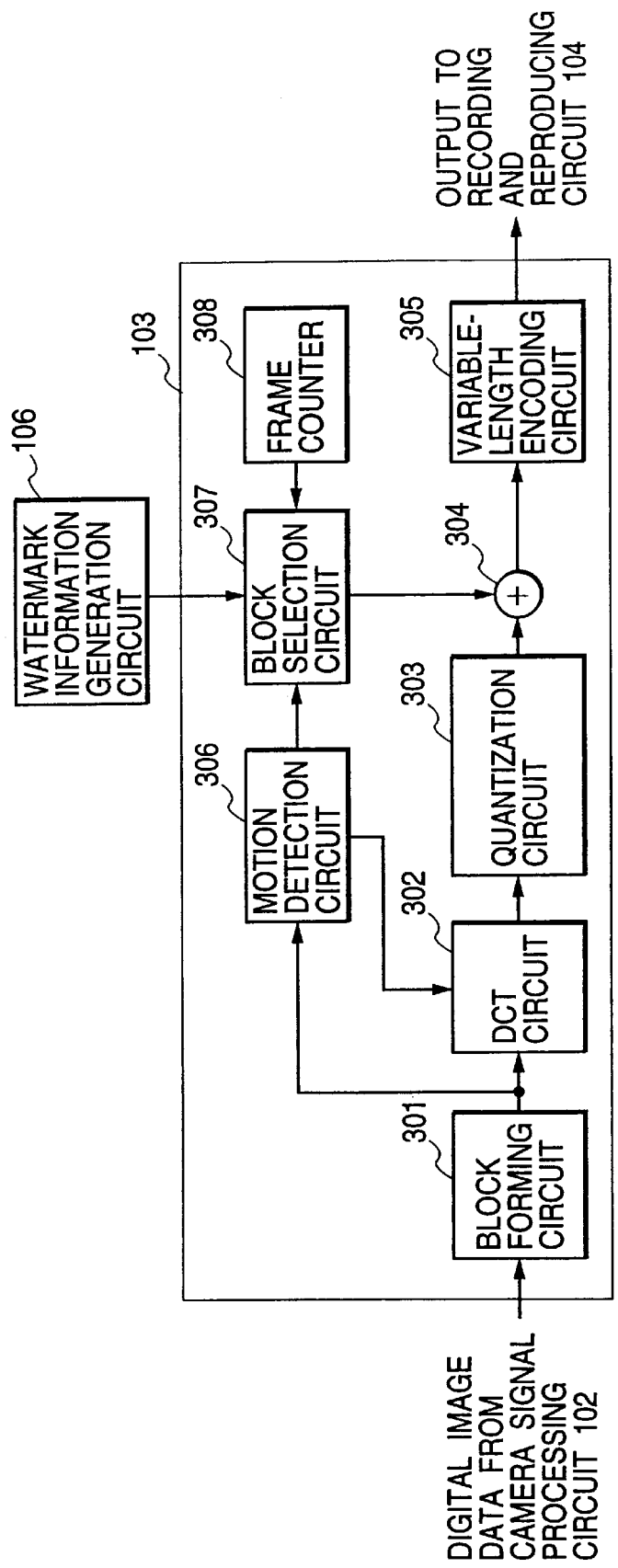
FIG. 6 is a detailed block diagram showing a compression encoding circuit 103 in a second embodiment.

FIG. 6 is a detailed block diagram of the compression encoding circuit 103 of the second embodiment.

Referring to FIG. 6, the image data entered into the compression encoding circuit 103 are divided by a block formation circuit 301 into blocks of a size of 8×8 pixels in the horizontal and vertical directions. The image data of thus divided block are supplied to a motion detection circuit 306 and a DCT circuit 302.

The motion detection circuit 306 discriminates the motion of the image in each block, through a process similar to that in the motion detection circuit 206 of the first embodiment.

The image data are converted in the DCT circuit 302 into DCT coefficients in the unit of the above-mentioned block, and are quantized in a quantization circuit 303. The DCT circuit 302 has a frame transformation mode and a field transformation mode as in the first embodiment, and these modes are selected according to the output of the motion detection circuit 306.

A block identified by the motion detection circuit 306 as showing motion, as shown in FIG. 5, is selected by a block selection circuit 307, and the watermark information generated by the watermark information generation circuit 106 is superposed, in an adder 304, to the image data of such block showing motion. However, as in the first embodiment, the block selection circuit 307 conceals the watermark information only in a frame in which motion is detected in a predetermined number of blocks, based on a predetermined frame interval obtained by a frame counter 308. Thus, the watermark information is not concealed in the image data of all frames, but is superposed with the image data of the blocks showing motion at a fixed frame interval or with a random frame interval.

The image data from the adder 304 are subjected to data compression by variable-length encoding, such as Huffman encoding, in a variable-length encoding circuit 305, and are supplied to the recording/reproducing circuit 104.

In the following there will be explained the method of superposing the watermark information with the image data in the second embodiment.

The concealing of the watermark information in the image data is achieved by the concealing of encoded watermark information, in consideration of the redundancy (noise margin) of the image.

In the present embodiment, one bit of the watermark information is concealed in each block showing motion. In the present embodiment, the watermark information is concealed in the data of low frequency AC components after DCT conversion, in order to provide resistance to any attack, such as the encoding efficiency of Huffman encoding employed in the succeeding variable-length encoding circuit 305 or the enlarging or reducing conversion.

Watermark information of plural bits in total is concealed by the above-described concealing method in plural blocks. Also, the order of concealing of the watermark information has to be determined in advance in order to enable decoding of the watermark information. In the present embodiment, the watermark information is concealed in succession in each block showing motion, starting from the block at the upper left corner of the image. FIG. 5 shows an example of the order of concealing of the watermark information, and the numbers in the blocks indicate the order of concealing of the watermark information.

In contrast to the first embodiment, the present embodiment conceals the watermark information into the spatial frequency components after DCT in the blocks showing motion, and is therefore superior in resistance to the attack in comparison with the first embodiment. The present embodiment employs DCT for conversion into frequency components, but such method is not restrictive and the conversion into the frequency components may also be achieved by FFT (fast Fourier transformation).

In the present embodiment, the watermark information is concealed in a part of the frequency space of the image with motion, whereby the watermark information is scarcely detectable in the decoded image but the watermark information continues to remain in the encoded image.

Also, as watermark information is concealed in the moving image only in a part thereof in which motion is detected, it is not possible to extract the watermark information through comparison of successive images, so that any third person is unable to find the presence of the watermark or the location thereof. Furthermore, as the watermark information cannot be extracted even after the moving image is cut out or modified, the advantages of preventing illegal use of the moving image and tracing such illegal use may be obtained.

Furthermore, the watermark information is concealed only in an image area showing motion, so that the image deterioration resulting from the concealing of the watermark information can be rendered inconspicuous visually.

In the following there will be explained a third embodiment of the present invention with reference to the accompanying drawings.

Figure 7:
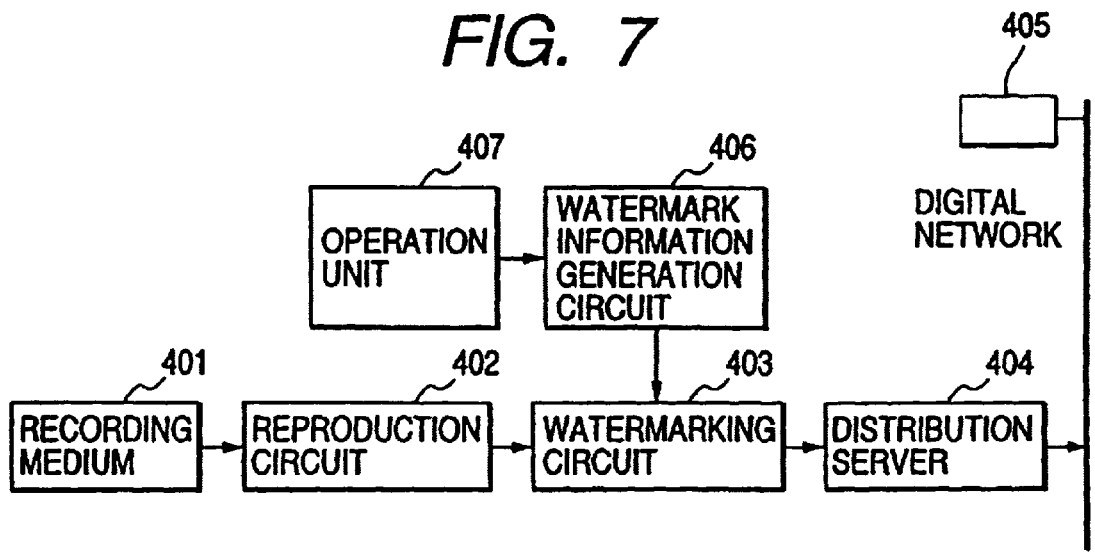
FIG. 7 is a block diagram showing the configuration of an image processing apparatus constituting a third embodiment of the present invention.

FIG. 7 is a block diagram showing the configuration of an image processing apparatus constituting the third embodiment of the present invention.

Referring to FIG. 7, the compression encoded image data is read from a recording medium 401 by a reproduction circuit 402. The recording medium 401 can be composed, for example, of a hard disk, a RAM a video tape or a DVD.

Figure 8:
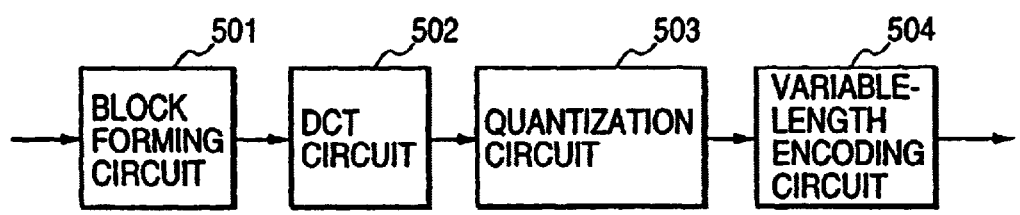
FIG. 8 is a block diagram showing the configuration of an encoding circuit for generating image data encoded and recorded on a recording medium 401.

The image data recorded on the recording medium 401 are encoded by an encoding circuit constructed as shown in FIG. 8.

FIG. 8 is a block diagram showing the configuration of the encoding circuit for generating encoded image data, to be recorded on the recording medium 401.

Referring to FIG. 8, a block forming circuit 501 divides the entered image data into blocks of a size of 8×8 pixels in the horizontal and vertical direction. The image data divided into blocks by the block forming circuit 501 is subjected to DCT conversion in units of such blocks, then quantized in a quantization circuit 503 and subjected to variable-length encoding such as Huffman encoding in a variable-length encoding circuit 504.

Again referring to FIG. 7, the encoded image data reproduced by the reproduction circuit 402 is subjected, by a watermarking circuit 403, to the concealing of the watermark information generated by a watermark information generation circuit 406, according to an instruction from an operation unit 407, as will be explained later in more details. A distribution server 404 transmits the image data, output from the watermarking circuit 403, to a digital network 405.

In the following there will be explained the details of the watermarking circuit 403 with reference to FIG. 9, which is a detailed block diagram thereof.

Figure 9:
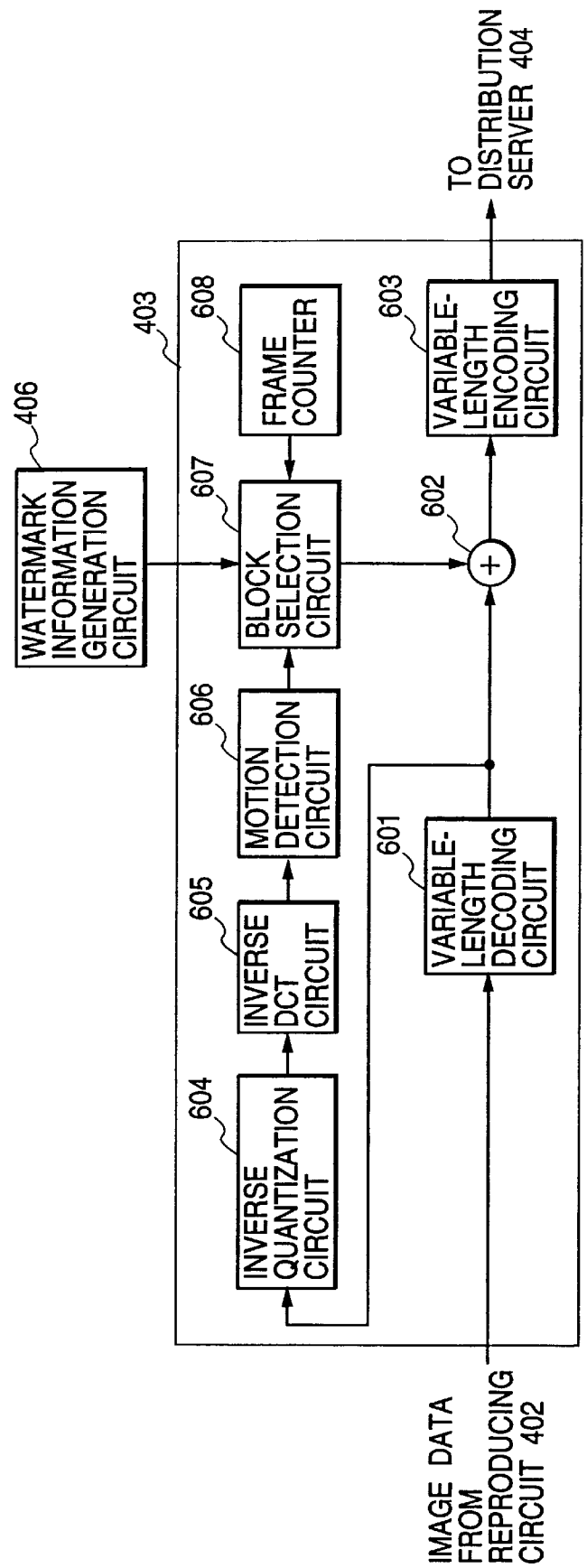
FIG. 9 is a detailed block diagram of a watermarking circuit 403.

Referring to FIG. 9, a variable-length decoding circuit 601 executes variable-length decoding of the encoded image data reproduced by the reproduction circuit 402. The image data output from the variable-length decoding circuit 601 is image data composed of frequency components. The image data of frequency components, decoded in the variable-length decoding circuit 601, is supplied to an adder 602 for superposing the watermark information and an inverse quantization circuit 604.

The inverse quantization circuit 604 executes inverse quantization of the image data decoded in the variable-length decoding circuit 601. The inverse quantized image data are subjected to inverse DCT conversion in the unit of the above-mentioned block by an inverse DCT circuit 605, whereby the data of the frequency components are converted into in the image data prior to the encoding.

A motion detection circuit 606 detects, in units of the blocks, motion in the image data from the inverse DCT circuit 605, through a process similar to that in the foregoing first embodiment.

A block identified by the motion detection circuit 606 as showing motion, as shown in FIG. 5, is selected by a block selection circuit 607, and the watermark information generated by the watermark information generation circuit 606 is superposed, in the adder 602, to the decoded image data. However, the block selection circuit 607 conceals the watermark information only in a frame in which motion is detected in a predetermined number of blocks, based on a predetermined frame interval obtained by a frame counter 608. Thus, the watermark information is not concealed in the image data of all frames, but is superposed with the image data of the blocks showing motion with a fixed frame interval or with a random frame interval. In this context, the watermark information concealing method is the same as the second embodiment.

The image data output from the adder 602 is again variable-length encoded by the variable-length encoding circuit 603, and supplied to the distribution server 404.

In the present embodiment, the watermark information (for example copyright information) can be concealed anew into the encoded image data for distribution through the network, so that it is rendered possible to protect the copyright of the distributed image data.

Also, the watermark information is concealed in a part of the frequency space of the image with motion, whereby the watermark information is scarcely detectable in the decoded image but the watermark information continues to remain in the encoded image.

Also, as watermark information is concealed in the moving image only in a part thereof in which motion is detected, it is possible to prevent increase in the data amount. Also, as the still image portion does not contain the watermark information, it is not possible to extract the watermark information through comparison of successive images, so that any third person is unable to find the presence of the watermark or the location thereof. Furthermore, as the watermark information cannot be extracted even after the moving image is cut out or modified, the advantages of preventing illegal use of the moving image and tracing such illegal use may be obtained.

Furthermore, the watermark information is concealed only in an image area showing motion, so that the image deterioration resulting from the concealing of the watermark information can be rendered inconspicuous visually.

In the following there will be explained a fourth embodiment with reference to the accompanying drawings.

The overall configuration of the fourth embodiment is similar to that of the first embodiment and is as already explained with reference to FIG. 1. However, the internal configuration of the compression encoding circuit 103 is different from that in the first embodiment. In the following there will be explained the configuration and the process of the compression encoding circuit 103.

Figure 10:
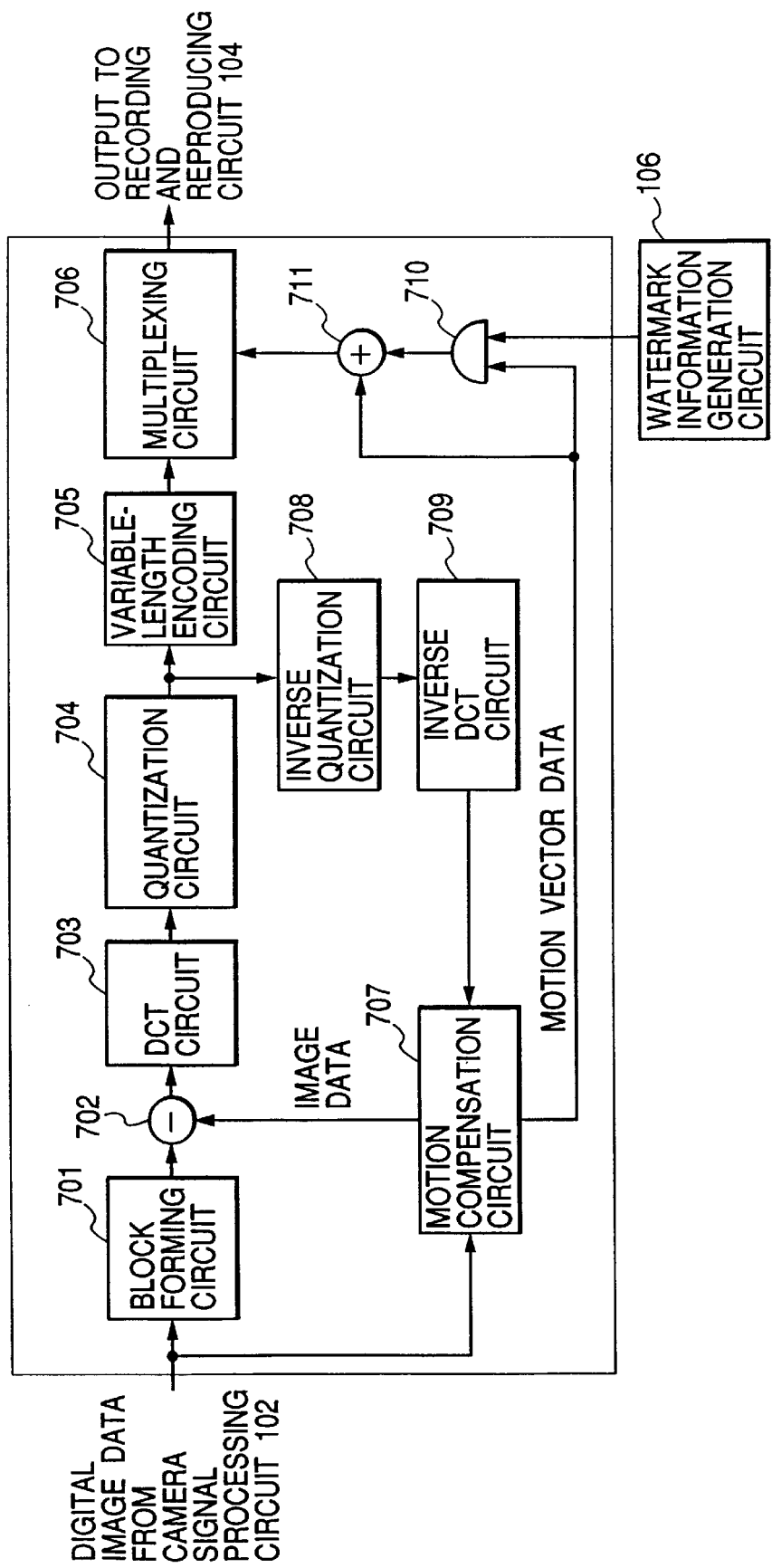
FIG. 10 is a detailed block diagram showing a compression encoding circuit 103 in a fourth embodiment.

FIG. 10 is a detailed block diagram of the compression encoding circuit 103 in the fourth embodiment, and this circuit executes compression encoding based on MPEG-1 or MPEG-2 standard, in the fourth embodiment.

Figure 11:
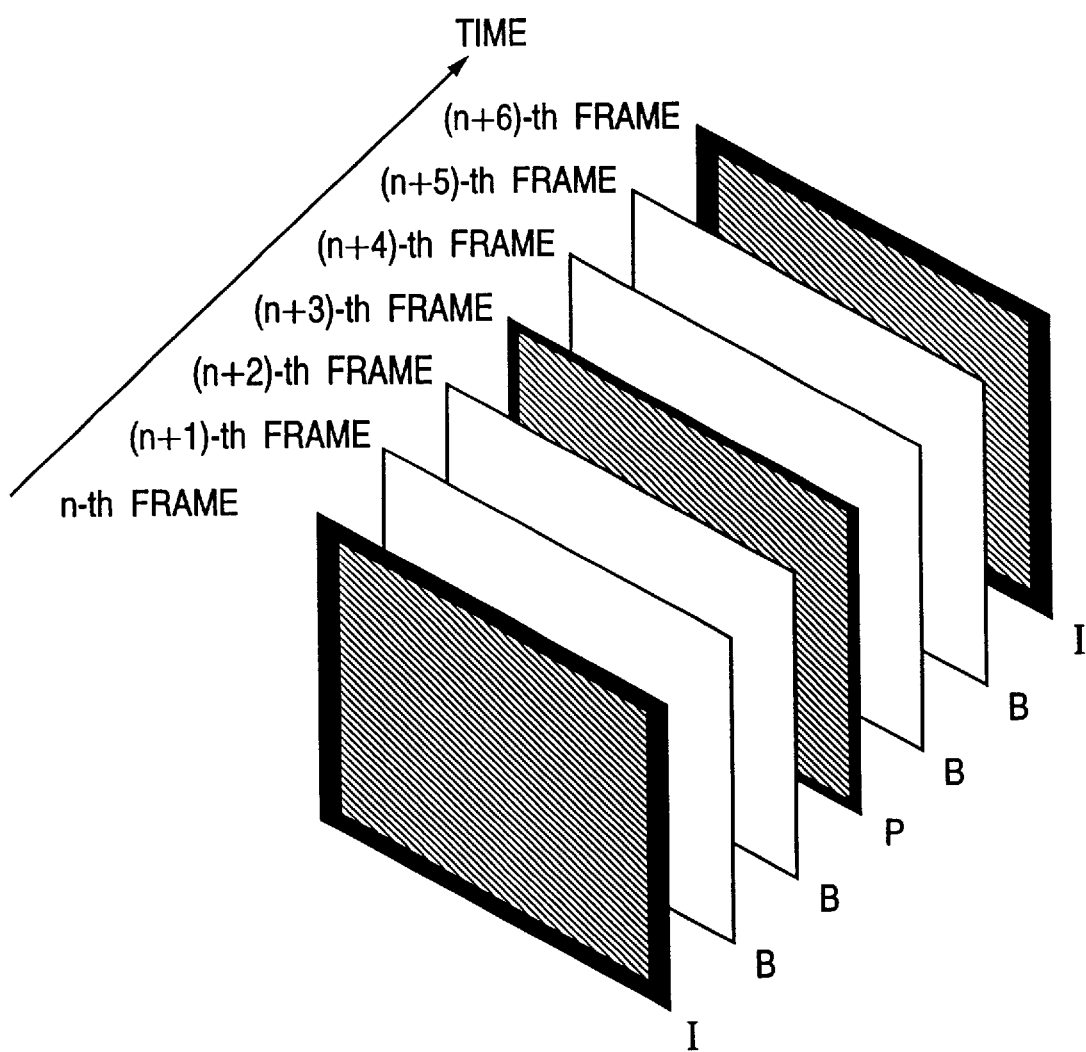
FIG. 11 is a view showing an example of arrangement of image types in MPEG encoding.

The MPEG-1 or MPEG-2 standard executes the encoding process for example with an arrangement of the types of the pictures as shown in FIG. 11.

In the MPEG standard, there are defined pictures of three types, namely I-picture, P-picture and B-picture.

For the I-picture (frames n and n+6 in FIG. 11), there is executed an in-frame encoding (intra encoding). For the P-picture (frame n+3 in FIG. 11), the encoding is executed with interframe estimation in the forward direction. For example, for the frame n+3 there is conducted motion compensation encoding with reference to the frame n+6.

For the B-picture (frames n+1, n+2, n+4, n+5 in FIG. 11), the encoding is executed with interframe estimation in both directions. For the B-picture, there is conducted motion compensation encoding with Preference to the I- and P-pictures positioned in front and at rear.

In the present embodiment, the watermark information is concealed into the P-picture. In the following there will only be explained the processing of the P-picture. However, the watermark information may also be concealed similarly into the B-picture.

Referring to FIG. 10, the entered digital image data is divided by a block forming circuit 701 into blocks of a size of 8×8 pixels in the horizontal and vertical directions. The image data divided into blocks is subjected to the calculation, by a subtractor 702, of the difference from image data from a motion compensation circuit 707 to be explained later, and the obtained difference is supplied to a DCT circuit 703, which executes DCT conversion in units of the blocks.

The image data after DCT process is quantized by a quantization circuit 704, and the quantized image data are supplied to an inverse quantization circuit 708 for partial decoding to be explained later, and are subjected to variable-length encoding such as Huffman encoding by a variable-length encoding circuit 705.

On the other hand, the inverse quantization circuit 708 executes inverse quantization on the image data output from the quantization circuit 704, and an inverse DCT circuit 709 executes partial decoding to the image data prior to the encoding.

The partially decoded image data are supplied to a motion compensation circuit 707, then retained for a predetermined period, and compared with the currently entered image data to detect the motion (detection of motion vector). The motion compensation circuit 707 supplies the subtractor 702 with image data of a corresponding part for effecting compensation of the motion.

The motion compensation circuit 707 detects motion in units of blocks of 16×16 pixels in the present embodiment, thereby detecting the data of the above-mentioned motion vector. The motion vector is supplied to a gate circuit 710 and an adder 711.

The gate circuit 710 transmits the watermark information, generated by the watermark information generation circuit 106, when the motion vector exceeds a predetermined level. Thus, when the motion vector exceeds the predetermined level, the watermark information is transmitted by the gate circuit 710, and is superposed with the motion vector data in the adder 711. When the motion vector does not exceed the predetermined level, the watermark information is not transmitted by the gate circuit 710 and is therefore not superposed with the motion vector data.

The motion vector data, output from the adder 711, is multiplexed, in a multiplexing circuit 706, with the encoded image data and output to the recording/reproducing circuit 104.

In the present embodiment, movement of a motion vector is made to correspond to a bit in the bit train of the watermark information, and the watermark information is composed of a combination of plural motion vectors. The number of motion vectors to be employed and the order of addition of the bits of the watermark information are naturally determined in advance, since this information is required for restoring the watermark information.

In the present embodiment, the watermark information is concealed, among the motion vectors obtained from the detection of motion, in those of a portion showing a large motion, whereby the watermark information can be incorporated in the unobservable portion of the image, without deterioration of the image.

Furthermore, the present embodiment provides an effect that any third person is unable to find the presence of the watermark or the location thereof. Furthermore, as the watermark information cannot be extracted even after the moving image is cut out or modified, the advantages of preventing illegal use of the moving image and tracing such illegal use may be obtained.

The present invention may also be applied to a system consisting of plural equipment (for example a host computer, interface devices, a reader, a printer etc.) or an apparatus consisting of a single equipment (such as a digital video cassette recorder, a digital camera or a digital television).

Also, the present invention includes a case where program codes of a software program for realizing the functions of the foregoing embodiments are supplied to a computer of the apparatus or the system connected to various devices so as to control such devices for achieving such functions, and the computer (MPU or CPU) of such system or apparatus operates such devices according to the stored program.

In such a case, the program codes themselves of the software program realize the functions of the aforementioned embodiments, and the program codes themselves, and the means for supplying the computer with such program codes, such as a memory medium storing the program codes, constitutes the present invention.

The memory medium storing such program codes can be, for example, a floppy disk, a hard disk, an optical disk, a magnetooptical disk, a CD-ROM, a magnetic tape, a non-volatile memory card or a ROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the foregoing embodiments.

The present invention further includes a case wherein the program codes read from the memory medium are first stored in a function expansion board concealed in the computer or a function expansion unit connected to the computer, and a CPU provided in the function expansion board or the function expansion unit executes all the process or a part thereof according to instructions of such program codes, thereby realizing the functions of the aforementioned embodiments.

In other words, the foregoing description of the preferred embodiments has been given for illustrative purposes only, and is not to be construed as imposing any limitation in every aspect.

The scope of the invention is, therefore, to be determined solely by the following claims and not limited by the text of the specifications and alterations made with a scope equivalent to the scope of the claims fall within the true spirit and scope of the invention.

What is claimed is:

1. An image processing apparatus comprising:
    input means for inputting image data successively;
    motion discrimination means for discriminating motion of the image data; and
    superposing means for superposing watermark information on information data corresponding to a pixel value of the image data input by said input means, wherein said superposing means selectively superposes the watermark information on the information data corresponding to a pixel value of the image data from each of which said motion discrimination means discriminates the motion of the image data.

2. An apparatus according to claim 1, further comprising:
    encoding means for encoding the image data.

3. An apparatus according to claim 2, wherein said encoding means includes conversion means for orthogonal conversion of the image data in the unit of a block composed of a predetermined number of pixels.

4. An apparatus according to claim 3, wherein said superposing means superposes the watermark information on the information data of lower frequency components output from said conversion means.

5. An apparatus according to claim 4, wherein said discrimination means discriminates motion in units of blocks, and said superposing means superposes the watermark information with the information data of a block which is discriminated to show motion by said discrimination means.

6. An apparatus according to claim 2, wherein said input means includes image pickup means for picking up the image of an object and outputting the image data.

7. An apparatus according to claim 6, further comprising:
    recording means for recording the image data, encoded by said encoding means, on a recording medium.

8. An apparatus according to claim 1, wherein said superposing means superposes the watermark information on the information data of a picture containing at least a predetermined number of blocks showing motion.

9. An apparatus according to claim 1, wherein said motion discrimination means detects motion of the image data in units of blocks composed of a predetermined number of pixels, and said superposing means superposes watermark information data on the information data of a block which is detected to show motion by said motion discrimination means.

10. An apparatus according to claim 9, wherein said superposing means superposes the watermark information on the information data of a picture containing at least a predetermined number of blocks showing motion.

11. An apparatus according to claim 1, wherein
    image data entered by said input means is encoded image data;
    said input means includes decoding means for decoding said encoded image data;
    said motion discrimination means discriminates motion of the image data decoded by said decoding means; and
    said superposing means superposes the watermark information with the information data decoded by said decoding means, according to the result of discrimination by said motion discrimination means.

12. An apparatus according to claim 11, further comprising:
    encoding means for encoding the image data in which the watermark information is superposed by said superposing means.

13. An apparatus according to claim 12, further comprising:
    recording means for recording the image data, encoded by said encoding means, on a recording medium.

14. An apparatus according to claim 1, wherein said motion discrimination means outputs motion vector data representing motion of an image, and said superposing means superposes the watermark information according to the magnitude of the motion vector data.

15. An image processing method comprising the steps of:
    inputting image data successively;
    discriminating motion of the image data; and
    superposing watermark information on information data corresponding to a pixel value of the image data input in said input step, wherein said superposing step includes a step of selectively superposing the watermark information on the information data corresponding to a pixel value of the image data from each of which the motion of the image data is discriminated in said discrimination step.

16. A computer readable memory medium storing an image processing program comprising:
    an input step of inputting image data successively;
    a discrimination step of discriminating motion of the image data; and
    a superposing step of superposing watermark information on information data corresponding to a pixel value of the image data input in said input step, wherein said superposing step includes a step of selectively superposing the watermark information on the information data corresponding to a pixel value of the image data from each of which the motion of the image data is discriminated in said discrimination step.

17. An image processing apparatus comprising:
    input means for inputting encoded image data;
    decoding means for decoding the encoded image data input by said input means;
    detection means for detecting motion of the image data decoded by said decoding means;
    superposing means for superposing watermark information on information data corresponding to a pixel value of the image data decoded by said decoding means, wherein said superposing means selectively superposes the watermark information on the information data corresponding to a pixel value of the image data from each of which said detection means detects the motion of the image data; and
    encoding means for encoding image data processed by said superposing means.

18. An apparatus according to claim 17, wherein said superposing means superposes the watermark information on a low frequency component of the image data.

19. An apparatus according to claim 17, wherein the encoded image data input by said input means is moving image data, and wherein said superposing means superposes the watermark information on a portion of frames of the image data, which portion is selected according to the detection result of said detection means.

20. An apparatus according to claim 17, wherein said input means includes read-out means for reading out encoded image data from a recording medium.

21. An image processing method comprising;
    an input step of inputting encoded image data;
    a decoding step of decoding encoded image data input in said input step;
    a detection step of detecting motion of the image data decoded in said decoding step;
    a superposing step of superposing watermark information on information data corresponding to a pixel value of the image data decoded in said decoding step, wherein said superposing step selectively superposes the watermark information on the information data corresponding to a pixel value of the image data from each of which the motion of the image data is detected in said detection step; and
    an encoding step of encoding the image data processed in said superposing step.

22. A computer readable memory medium storing an image processing program comprising:
    an input step of inputting encoded image data;
    a decoding step of decoding encoded image data input in said input step;

a detection step of detecting motion of the image data decoded in said decoding step;

a superposing step of superposing watermark information on information data corresponding to a pixel value of the image data decoded in said decoding step, wherein said superposing step selectively superposes the watermark information on the information data corresponding to a pixel value of the image data from each of which the motion of the image data is detected in said detection step; and an encoding step of encoding the image data processed in said superposing step.

* * * * *

UNITED STATES PATENT AND TRADEMARK OFFICE
CERTIFICATE OF CORRECTION

PATENT NO. : 6,639,996 B2
DATED : October 28, 2003
INVENTOR(S) : Hirofumi Suda

It is certified that error appears in the above-identified patent and that said Letters Patent is hereby corrected as shown below:

Column 4,
Line 41, "concealmeant" should read -- concealment --.

Column 7,
Line 2, "a RAM" should read -- a RAM, --.

Column 8,
Line 2, "example" should read -- example, --.
Line 55, "Preference" should read -- reference --.

Column 9,
Line 66, "of-plural" should read -- of plural --; and "example" should read -- example, --.

Column 12,
Line 45, "comprising;" should read -- comprising: --.

Signed and Sealed this

Fifteenth Day of June, 2004

JON W. DUDAS
*Acting Director of the United States Patent and Trademark Office*